R. BROWN.
Harvester.

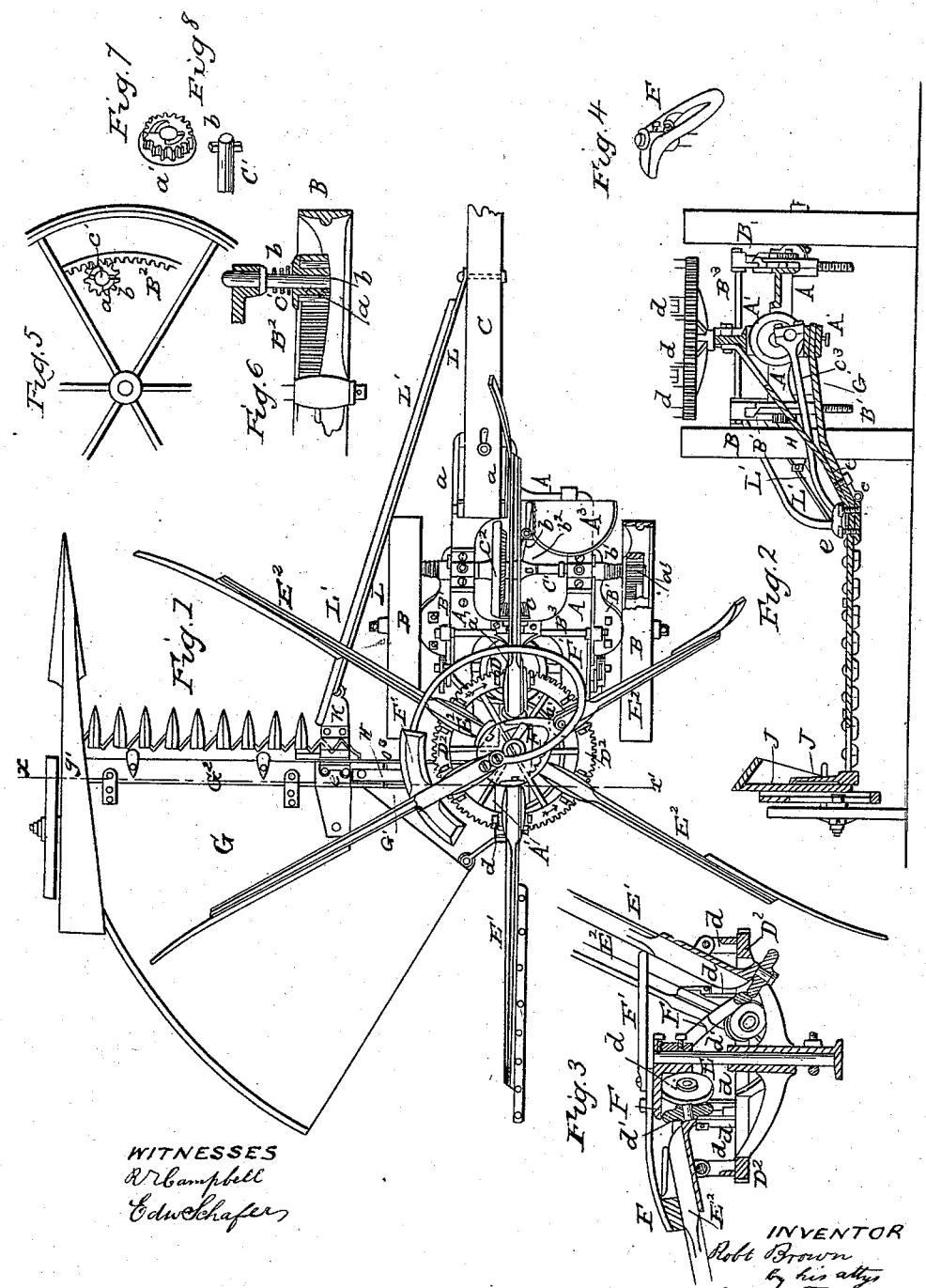

No. 56,893.

2 Sheets—Sheet 2.

Patented Aug. 7, 1866.

UNITED STATES PATENT OFFICE.

ROBERT BROWN, OF DAYTON, OHIO.

IMPROVEMENT IN REAPING AND MOWING MACHINES.

Specification forming part of Letters Patent No. 56,893, dated August 7, 1866.

*To all whom it may concern:*

Be it known that I, ROBERT BROWN, of Dayton, in the county of Montgomery and State of Ohio, have invented certain new and useful Improvements in Harvesting Machinery; and I do hereby declare that the following is a full, clear, and exact description thereof, reference being had to the accompanying drawings, making a part of this specification, in which—

Figure 9:
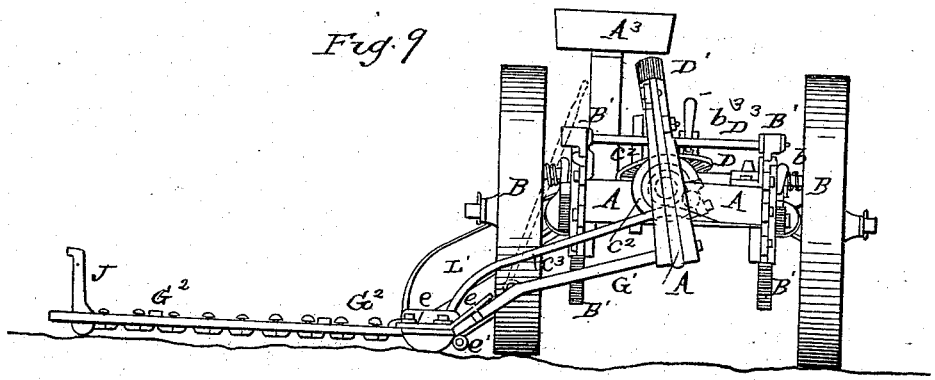
Figure 10:
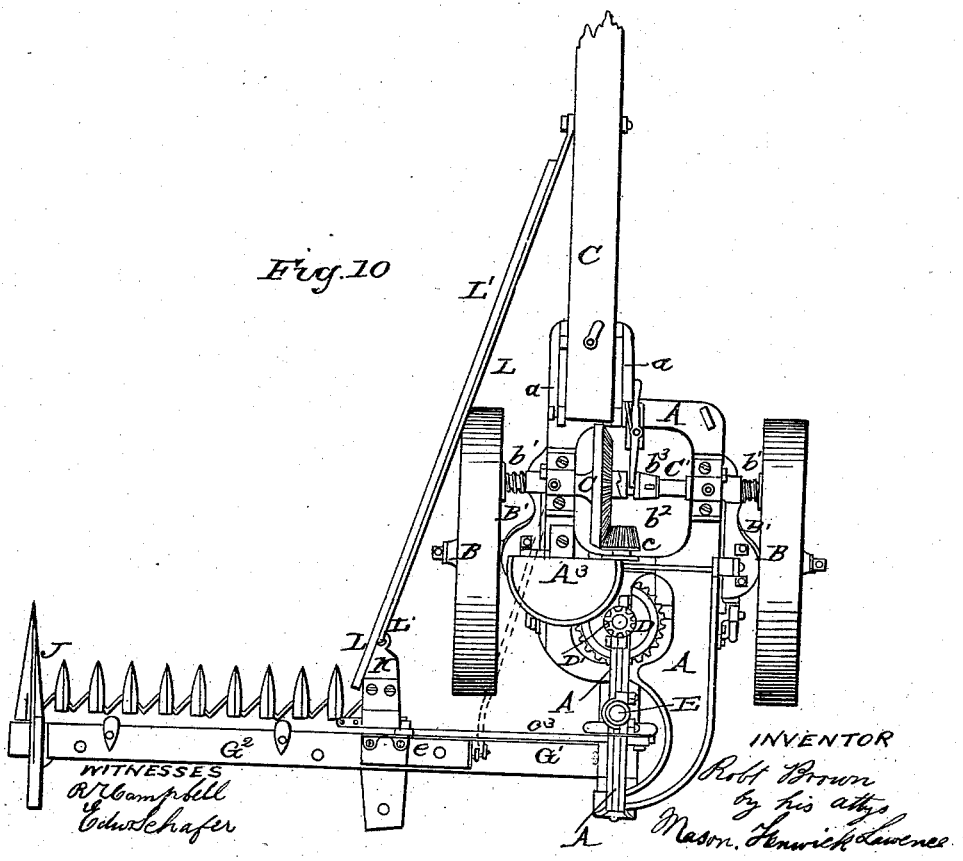

Figure 1, Sheet 1, is a plan view of a harvesting-machine with rake attached. Fig. 2, Sheet 1, is a sectional view taken in the vertical plane indicated by red line $x\ x$ in Fig. 1. Fig. 3, Sheet 1, is a sectional view of the crown-wheel which actuates the rake-arms and gathering-arms, showing the manner of working said arms. Fig. 4, Sheet 1, is a perspective view of the stationary cam which depresses the inner ends of the rake and gathering arms as these arms sweep over the draft-frame. Figs. 5, 6, 7, and 8 are views in detail of an automatic clutch for starting and stopping the rakes and gathering-arms. Fig. 9, Sheet 2, is an elevation of the rear end of the same machine when arranged for mowing. Fig. 10 is a top view of the machine as shown in Fig. 9.

Similar letters of reference indicate corresponding parts in the several figures.

This invention relates to certain novel improvements on that class of harvesting-machines in which the raking and reeling arms revolve about a common center and also have independent centers of motion, about which they vibrate, so that the rakes and gathering arms or reels are caused to sweep the grain from a curved platform and deliver it in gavels behind the draft-frame and then rise to such a position as will allow them to sweep over and clear the draft-frame and the driver's seat thereon as they successively move toward the standing grain in front of the platform.

The invention also relates to improvements on the raking attachments for harvesters, which operate upon the general principle set forth and secured by me in my reissued patent, which was originally dated on the 18th day of June, 1861, said principle consisting, in part, in supporting the raking devices in such manner that the rake and reel arms will always accommodate themselves to, and move in harmony with, the undulations of the platform or finger-beam.

The object of this invention and improvement is to have the rake and reel arms supported by independent bearings upon a crown-wheel, which turns about a central axis, in such manner that the rising and falling movements of said arms shall be effected by means of a cam, which is applied within the circumference of said wheel, as will be hereinafter described.

Another object of my invention is to provide a combined reaping and mowing machine having a rake attachment with means for obtaining two articulating joints for the platform and for locking one of these joints at pleasure, as will be hereinafter described.

The following is a description of my invention.

In the accompanying drawings, A represents the draft-frame, which is supported by two transporting-wheels, B B, that also serve as driving-wheels for the raking and cutting apparatus. The draft-frame A is constructed with a rear curved projection, which affords a rear support for an oscillating yoke, A', that carries the post about which the rakes and gathering-arms revolve, as will be hereinafter described.

The forward part of the draft-frame A, on that side nearest the cutting apparatus, has a projection, which is constructed with two perpendicular flanges, $a\ a$, forming side supports for the rear portion of the draft-pole C, which portion is fitted between said flanges and pivoted at its extreme rear end thereto by a transverse pin. Forward of this pivot a bolt passes through the draft-pole and frame A, and receives on its upper end a nut having a handle projecting from it, by means of which the front end of the frame A can be adjusted with respect to the draft-pole.

The driving-wheels B B are upon short axles, which project from segments B' B', that are pivoted to the projecting ends of a transverse driving-shaft, C', forward of said axles. These segments are toothed, properly strengthened by ribs, and kept in proper place against the sides of frame A by forward and rear jaws, and also by means of pinion spur-wheels and dogs or pawls. By releasing the pinion spur-wheels from their pawls the segments can be loosened from the main frame A, and this frame raised or lowered bodily.

The horizontal transverse rod, which is lettered $B^3$ in Figs. 2, 9, and 10, is used for connecting the upper ends of the two segments together, and serving as an additional brace for them.

The main driving-shaft $C'$ has two pinion spur-wheels, $a'$ $a'$, applied on its extremities, so as to engage with the teeth of inside gear $B^2$ on the driving-wheels B B, as shown in Figs. 1, 5, and 6. These pinions $a'$ $a'$ are placed loosely upon their shaft and allowed to have a slight end play thereon; also, to turn freely on their shaft when the machine is moved backward; but when the machine is moved forward said pinions turn the main shaft $C'$. This is effected by making inclined planes in the outer ends of the pinions $a'$, as clearly shown in Figs. 5 and 7, and applying a key-pin, $b$, through the ends of shaft $C'$, against which said pinions are forced by springs $b'$. When the machine is moved backward the springs $b'$ $b'$ will allow the pinions $a'$ $a'$ to move inward and free themselves from the pins $b$; but when the pinions are turned in an opposite direction they are caught by the pins $b$ and caused to turn the shaft $C'$, thus automatically engaging the driving-wheels with the main shaft, and disengaging them from it at the proper times.

Between the sides of the main frame an opening is made which affords lightness, and also a space for a large beveled spur-wheel, $C^2$, that is placed loosely on its shaft $C'$, and caused to engage with it when desired by means of a sliding spring-clutch, $b^2$. This clutch is acted upon by a yoked lever, $b^3$, that has its fulcrum upon the frame A, and which is moved by the driver sitting in his seat $A^3$ when he desires to stop the motion of the rakes and gathering-arms and the cutting apparatus. The bevel-wheel $C^2$ engages with the teeth of a beveled pinion, $c$, which is keyed on the forward end of a longitudinal shaft, $c'$, that passes through the tubular portion of the oscillating yoke $A'$, and carries on its rear end a crank-wheel, $c^2$, which communicates a reciprocating movement to the sickle through the medium of pitman-rod $c^3$. The yoke $A'$ and shaft $c'$ have a common center of motion, the rear bearing for the former being the rear projection of the frame A, and its forward bearing is the shaft $c'$. This oscillating yoke $A'$ is constructed with a bearing for a short shaft, that carries on its lower end an inclined bevel-spur wheel, D, which engages with a pinion on the shaft $c'$, and on the upper end of this short shaft a pinion-wheel, $D'$, is keyed, which engages with the teeth of a dished crown-wheel, $D^2$, that has its bearings upon the yoke $A'$ and turns around a post, E, which is secured rigidly to said yoke. The crown-wheel $D^2$ has considerable elevation above the yoke $A'$, which is obtained by dishing its arms or spokes, as represented in Figs. 2 and 3, and constructing it with a long hub or tubular eye. On top of the narrow rim of this wheel, and arranged at regular intervals apart, are a number of short standards, $d$ $d$, between which the rake-arm $E'$ and reel or gathering arms $E^2$ are pivoted, as shown in Figs. 1 and 3. These rake and reel arms are all about of an equal length, and when pivoted to their respective standards $d$ $d$ they all radiate from the center of their crown-wheel. The short arms of these rake and reel arms project inward and have anti-friction rollers $d'$ applied on their inner ends, the peripheries of which rollers may be slightly rounded, as shown in Fig. 3. These anti-friction rollers are held down by means of an elliptical cam, F, a portion of which is in, or nearly in, a plane at right angles to the plane of the fixed post E, while another portion is considerably depressed or inclined. This cam F is keyed fast to the upper end of the post E in such position that it will successively depress the short arms of the rakes and reels as they sweep around toward the rear of the draft-frame, thus elevating the rakes and reels during their movement over the draft-frame. As the crown-wheel revolves in the direction indicated by the arrows in Fig. 1, and the rakes and reels move over the draft-frame, they are allowed to descend to a position which is parallel, or nearly so, to the plane of the platform G, in which position they sweep over it, the rakes delivering the grain upon the ground in rear of the draft-frame.

I have represented but one rake in the drawings, combined with a number of reels or gatherers; but it is evident that more than one rake can be used. Both the rake and reels receive the same movement—i. e., they sweep around a common center, and rise and fall so as to clear the draft-frame as they sweep over it.

The cam which I employ for elevating the rake and reels over the draft-frame is shown in Fig. 4, and also in Fig. 3. In Figs. 1 and 3 a guard, $F'$, is shown connected to the cam F for the purpose of acting on top of the long arms of the rake and reels and holding them down to their work. The forward curved portion of said guard serves to keep the rollers $d'$ on the inner ends of the rake and reel arms up against their cam F as the rake and reels approach the standing grain in front of the platform, and that portion of the guard $F'$ which is over the inner edge of the platform G is intended for preventing the rake and reels from rising when their movement is resisted by the grain. The depressed portion of the cam F will raise the rake and reel arms to a perpendicular position at one point, so that they will not interfere with the position of the driver in his seat $A^3$. The guard $F'$ will then act upon said arms to keep their inner ends in contact with the cam F, as above mentioned. By dishing the crown-wheel $D^2$, as above described, I leave plenty of space below it and between its spokes for the depression of the short arms of the rake and reels, and am enabled to use such arms, so as to have an inner support for them between the axis of the crown-wheel and the narrow rim thereof. This arrangement also admits of the location of a cam, F, within the circumference of the crown-wheel and upon the post E. I thus secure independent bearings for the rake and reel arms upon the crown-wheel, and dispense with a curved or cam way outside of the circumference of said wheel for raising and depressing the rake and reels.

The post about which the crown-wheel and its appendages revolve is secured rigidly to the oscillating yoke A' and does not turn; consequently a firm support is afforded the crown-wheel, and no serious vibration is allowed to this wheel. The yoke A' and post E oscillate freely in a plane which is at right angles to the length of the draft-frame, and to the lower curved portion of said yoke a bar, G', is rigidly secured so as to project outward and downward a suitable distance, and to the outer end of this bar the inner end of the finger-beam $G^2$ is hinged, as shown in Figs 2, 9, and 10.

H represents an inclined brace, which is bolted rigidly to the upper curved portion of the yoke A' at one end, and similarly secured at its outer end to the outer end of the brace-bar G'. An angular plate, e, of suitable strength, is bolted over the hinge at e' to the finger-beam $G^2$ and brace-bar G', for the purpose of making a rigid joint at the point e', and allowing the platform to articulate about the axis of oscillation of the yoke A' only.

When the machine is used as a mower, and the raking and reeling attachments are all removed, as shown in Figs. 9 and 10, the platform G is allowed to articulate at the joint e' as well as at the joint of the yoke A'.

To the extreme outer end of the finger-bar $G^2$ a divider, J, is bolted, which is made of metal, and adapted for receiving and having bolted to it a large wooden or metallic divider, J', which latter is only used in cutting grain. This large grain-divider is constructed with a top guard which overhangs the outer edge of the platform G and causes the grain to fall upon the latter as it is gathered in and cut. When this divider J' is detached, as shown in Figs. 9 and 10, the smaller divider, J, is left upon the finger-beam and used in mowing.

The inner shoe or divider, K, has an oblique brace or draw-bar, L, pivoted to its front point, which bar is carried forward and again pivoted at its front end to the draft-pole C some distance forward of the main frame A, as shown in Figs. 1 and 10. This bar serves as a means for bracing the cutting apparatus against backward thrust, and at the same time allows the cutting apparatus and platform, when attached thereto, to rise and fall and accommodate itself to the inequalities of the surface of the ground.

To the bar L, I apply a wide board, L', which is intended to serve as a gatherer for grass or grain, and also as a fender for preventing grain from falling upon the inner wheel, or that wheel which is nearest the standing grain, and becoming tangled therewith.

When the machine is to be used for mowing, the outer divider, J', is removed. The cam F is loosened and detached from its post E, together with the crown-wheel $D^2$ and its rakes. The driver's seat $A^3$ is detached from the right-hand forward corner of the frame A and moved farther back on this frame, as shown in Figs. 9 and 10.

A lever, which I have indicated in red lines in Figs. 9 and 10, is applied to the frame A and the bar G' for enabling the driver, while sitting on his seat, to raise or lower the cutting apparatus. If desirable, the post E can be detached from the yoke A', when the machine is used as a mower.

Having thus described my invention, what I claim as new, and desire to secure by Letters Patent, is—

1. The combination of a crown-wheel which is adapted for receiving and forming independent bearings for vibrating rake and reel arms with a cam, F, which is fixed to the post E, around which said wheels turn, and which is so constructed as to act upon the inner projecting arms of the rake and reels, substantially as described.

2. Dishing or opening the crown-wheel $D^2$, for the purpose of receiving the cam F and allowing of depression of the inner projecting ends of the reel and rake arms, substantially as described.

3. The construction and combination of the cam F and guard F', for the purposes substantially as described.

4. In a combined reaping and mowing machine having a rake attachment, substantially as described, providing means, substantially as described, for making flexible or rigid the joint at e', substantially as specified.

5. The arrangement of the fender and gathering-board L' directly on the jointed drag-bar L, the said board extending along the whole length, or nearly so, of the drag-bar, and serving to assist the rake and reel in getting the grain on and off the platform without interfering with the motions of the platform, substantially as described.

ROBERT BROWN.

Witnesses:
JAMES TURNER,
FREDERICK S. SAGE.